United States Patent

Cunningham

[15] 3,642,037

[45] Feb. 15, 1972

[54] LIQUID TRANSFER SYSTEM

[72] Inventor: Ernest R. Cunningham, Libertyville, Ill.

[73] Assignee: Barr-Stalfort Company, Division of Pittway Corporation, Niles, Ill.

[22] Filed: Dec. 4, 1969

[21] Appl. No.: 881,946

[52] U.S. Cl. ..................141/348, 137/614.04, 251/149.7
[51] Int. Cl. ..................................B65b 1/04, B65b 3/04
[58] Field of Search ..............137/614.04; 251/149.6, 149.7; 141/346–352, 311, 392; 222/566

[56] References Cited

UNITED STATES PATENTS 2,730,382  1/1956  De Mastri..........................251/149.6

*Primary Examiner*—Houston S. Bell, Jr.
*Attorney*—Merriam, Marshall, Shapiro & Klose

[57] ABSTRACT

An essentially loss-free unidirectional liquid transfer system between closed containers having a pressure differential is disclosed. The liquid transfer filler and receptor nozzles have compressible material between them and a sliding sleeve to help prevent liquid loss. The check valves in the two nozzles are also of nonsimilar configuration so that fluid will flow around each valve.

13 Claims, 10 Drawing Figures

PATENTED FEB 15 1972 3,642,037
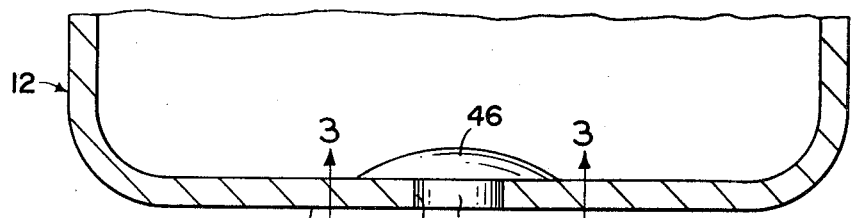
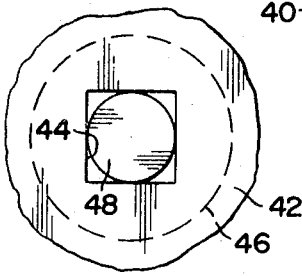
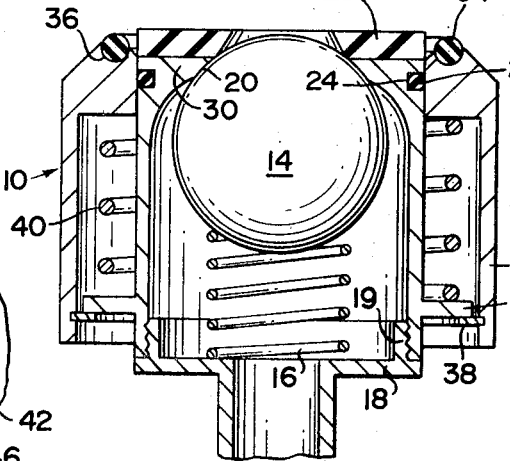
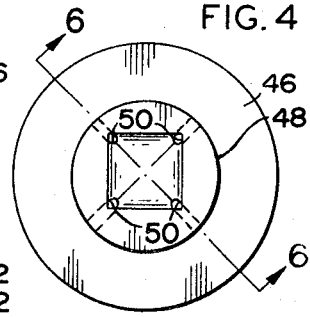
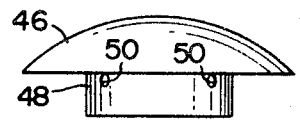
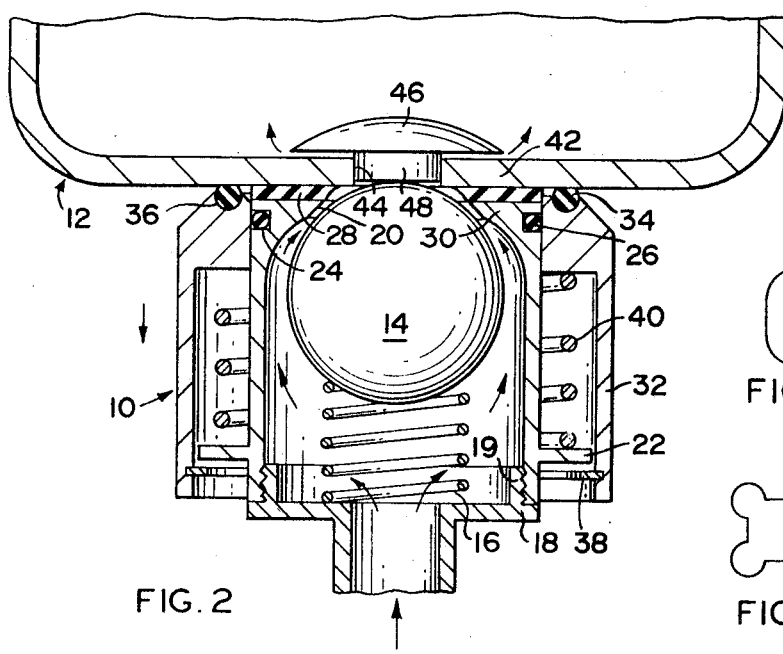
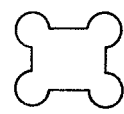
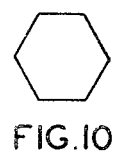
INVENTOR.
ERNEST R. CUNNINGHAM
BY
*Stefan M. Stein*
ATTORNEY.

LIQUID TRANSFER SYSTEM

This invention relates generally to a loss-free unidirectional liquid transfer system between closed containers having a pressure differential and more particularly to a ball and socket type interconnection between two closed, pressurized hydraulic systems which permits pressure equalization in only one direction, with minimum loss from either system or transfer connection to the atmosphere.

Many kinds of quick disconnect, self sealing couplings for fluid lines and the like are in use. Usually these couplings consist of two halves. One side consists of a spring loaded leak proof poppet or seal while the other side has a device to open the valve when the two parts are mated.

There are several advantages to having self-sealing quick disconnect couplings of this type, for instance, they allow easy and speedy connection of fluid lines and connectors of this type eliminate the need for draining or priming the system. Along with the speedy connect and disconnect, however, these couplings must also prevent entry of foreign matter of the surrounding atmosphere into the fluid system. Positive locking action must be assured when the lines are connected and the connection passage must remain free and not constrict flow of fluid within the line. Further, construction of the coupling must be such that it will be reliable and give long, trouble-free service.

There are four basic types of self-sealing couplings which are used today, they are commonly referred to as double poppet, sleeve and poppet, slide seal and double rotating ball couplings.

The double poppet type has a self-sealing poppet in each coupling half. As the coupling halves are brought together, the external seal is engaged by the male body of the other half. The two poppets are in a touching relationship yet, both halves are still sealed. When the two halves are moved closer together the poppets are both disengaged from their sealing surfaces. When the two halves are disconnected, the two poppets are sealed before the male and female parts disengage.

The disadvantages inherent in the double poppet coupling are that when the two halves are connected the air trapped between the two poppets enters the fluid system, and also because fluid is trapped between the poppets, there is a considerable amount of spillage when the line is disconnected.

A second type of self-sealing coupling is known as a sleeve and poppet connection. In this type of connection one coupling half consists of a self-sealing poppet while the other has a tubular valve and sleeve arrangement. Although this coupling does not have the positive coupling that the double poppet connection does, the sleeve and poppet does have the advantage of having both the poppet and sleeve fully closed before the line is disconnected. This means that there is very little trapped air to be forced into the line and that upon disconnect there is very little leakage. A disadvantage is however, that the seals are not positive, as in the double poppet self-sealing coupling.

A third type of self-sealing disconnect coupling is the slide seal. In this type a sliding gate covers the flow part on the sides of the respective couplings. The connection joint is under pressure during the connecting and disconnecting steps so that fluid is lost during these processes. Further, the amount of fluid lost is dependent upon the connect-disconnect time. One further disadvantage is that because of the configuration of the joints, due to the necessary location of the slide gate, there is a certain impedance to fluid flow due to the necessary change of direction of the fluid line.

A fourth general type is called the double rotating ball coupling. In this type of coupling each half of the coupling line has a ball with a passageway through the middle of it. In the disconnected condition, the passageway is transverse to the flow line. Upon connection, the balls are rotated until the passage is aligned to the axis of fluid travel. Although this type has the advantage of only slight pressure drop in the system during connection, the disadvantages include a large amount of air inclusion upon connection and a substantial amount of spillage. There is also the additional problem of adequate sealing around the balls.

In addition to the four basic designs enumerated above, many variations of these self sealing couplings have been developed, such as the stem valve for low-pressure applications, and others such as the diaphragm piercing poppet valves. The stem valve is much like the sleeve and poppet coupling described above except that the tubular valve is replaced by a stem valve. In the diaphragm-piercing poppet valve, a secondary inner seal is used to contain the fluid during extended storage periods. When the coupling is connected, a pointed poppet valve pierces the diaphragm to permit the flow through the coupling. Although this is satisfactory for some uses, it is obvious that this type of coupling, because the diaphragm is destroyed, can be used only once.

It is therefore an object of this invention to obtain a loss-free, unidirectional fluid transfer system between closed containers having a pressure differential.

Another object is to provide a self-sealing coupling which allows fluid transfer under pressure between closed containers without the introduction of foreign fluids into the system.

Still another object is to provide a self-sealing coupling which minimizes system fluid loss when the coupling is disengaged.

A further object is to provide a self-sealing coupling which has a minimum clearance volume around the point of coupling.

A still further object is to provide a self-sealing coupling wherein when engaged, a ball check valve contacts a noncircular opening whereby a flow path will be provided around contact points between said ball and noncircular opening.

Another object is to provide a self-sealing coupling such that backflow is prevented when the unit is disengaged.

Another object is to provide an enclosing seal system which isolates the pressure filling head and the receiving valve from the atmosphere.

Another object is to provide a self-sealing coupling which may be quickly disengaged.

Another object is to provide a self-sealing coupling which is of simple design, yet durable and reliable.

Another object is to provide a self-sealing coupling in which a seal member compresses in order to eliminate voids between the coupling valves prior to fluid flow.

Another object is to unseat a poppet by a point contact with a second sealing means whose point of contact configuration is different from that of the poppet, whereby fluid flow takes place around the valves through noncontact points.

Other objects of the invention will in part be obvious and will in part appear hereinafter.

The foregoing and other objects of the invention not specifically enumerated are efficiently attained by providing a ball and imperfect socket-type hydraulic interconnection between two closed, pressurized hydraulic systems which permits pressure equalization in only one direction, with minimum loss from either the system or junction point connection to the atmosphere.

One embodiment which accomplishes this is a filling nozzle which employs a biased check valve and a receptor nozzle which also has a check valve to prevent backflow. The biased check valve is preferably a spring-loaded ball valve. The filling nozzle is surrounded by a compressible, annular seal member at its forward end. The compressible, annular seal member makes initial contact around the receptor nozzle. Subsequently a sliding sleeve seal comes into contact with the receptor nozzle and continued linear motion of the filling nozzle forces the sleeve seal into a sealed relationship with said receptor nozzle. Additional linear movement forces the spring loaded ball valve off its seat by contact with a noncircular receptor nozzle opening. When the ball valve is unseated flow will occur around the ball and through the openings where the ball and receptor nozzle are not in contact at a rate proportioned to the elapsed time, the viscosity of the fluid, the pressure differential existing between the lines, and the geometry of the connection opening. If the openings in the receptor nozzle is square the flow will occur through the four corner area. However, any shaped opening in the receptor nozzle that allows flow around the receptor valve which is in contact with the ball valve will function adequately.

The invention accordingly comprises the features of construction, combination of elements, and arrangements of parts which will be exemplified in the construction hereinafter set forth and the scope of the invention will be indicated in the claims.

For a fuller understanding of the nature and objects of the invention, reference should be had to the following detailed description taken in connection with the accompanying drawings in which:

FIG. 1 is a cross section of the receptor and filler nozzle of the present invention.

FIG. 2 is the same cross section in the liquid transfer configuration.

FIG. 3 is a partial end view of the receptor nozzle.

FIG. 4 is a partial end view of a second receptor nozzle.

FIG. 5 is a side view of a receptor nozzle check valve.

FIG. 6 is a cross section of a receptor nozzle check valve through line 6—6 of FIG. 4.

FIGS. 7-10 show four configurations of receptor nozzle apertures.

Similar reference characters refer to similar parts throughout the several views of the drawing.

Referring now to FIGS. 1-3, an interconnection between a closed, pressurized system filling nozzle 10 and a second closed, system receptor nozzle or receiver means 12 are shown. In FIG. 1, filling nozzle 10 consists of a ball valve 14, biasing spring 16, contained within connector housing 18 formed of at least two parts threaded at 19. Connector housing 18 is connected to the terminal end of a pressurized fluid line (not shown) and is of a cylindrical shape with a generally circular aperture at the forward end. Aperture 20 is of smaller diameter than the housing 18 and is incurvated on its internal edge so as to form the circular valve seat for spring biased check ball 14. At its lower end, housing 18 is also provided with outwardly protruding annular flange 22. At the forward end of housing 18 is an inwardly extending annular channel 24 in which is seated a sealing rubber O-ring 26. On the top of housing 18 is an annular disc 28 of compressible material adhesively attached to apertured end portion 30 of housing 18. Surrounding housing 18 is a sealed sliding sleeve 32 terminating at its forward end with a circular rubber sealing O-ring 34. O-ring 34 is tightly held in an annular concavity 36 in the upper end of sleeve 32 and is placed so that only a portion of the O-ring is exposed and acts as a seal against which injector nozzle 10 is placed. The lower end of sleeve 32 is provided with an annular, inwardly extending, internally removable retaining ring 38 which acts as an abutment, in conjunction with flange 22, to hold sleeve 32 in place, against the urging of spring 40.

The receptor nozzle 12 has a flat receptor portion 42 large enough to allow disc 28 to form a seal around receptor nozzle aperture 44. The nozzle aperture, as seen by FIG. 3, is a square with a mushroom-shaped check valve 46 located over aperture 44 to prevent backflow of fluid within nozzle 12. Extending downward from and integral with check valve 46 is round poppet 48. Poppet 48 extends into nozzle aperture 44 to a point which is approximately flush with receptor portion 42.

In operation, the filler nozzle 10 is placed on receptor portion 42 in a surrounding relation to nozzle aperture 44. As the injector nozzle 10 is moved further toward the receptor or receiver 12 the compressible annular disc 28 is compressed until the internal stresses of the material exceeds the maximum filling pressure. Functionally this compressive layer 28 eliminates the void formed during linear travel of the nozzle before unseating of the poppet. Hence air is excluded from the system when the connection is formed and there is no loss of fluid from the system when the connection is broken. Subsequently, the O-ring 34 seals the area outside the compressible disc 28. Further linear travel of the injector nozzle 10 brings the ball 14 into forced contact with the edges of the noncircular receptor nozzle aperture 44. With ball 14 unseated, as seen in FIG. 2, flow occurs around the ball 14 and through the corners of the square aperture 44 where the ball 14 and aperture 44 are not in contact (i.e., at the four corners) as shown in FIG. 3.

After the desired flow has occurred, depending upon pressure differential, geometry of the valve, viscosity of the fluid and elapsed time, pressure on the injector nozzle is released. As housing 18 starts back, ball check valve 14 once again seats and the flow is terminated, mushroom check valve 46 also seats thus preventing backflow. There is no fluid trapped between the nozzles because plenum between the nozzles is taken with compressible material 28. Hence, when the O-ring seal is broken no fluid is lost to the atmosphere.

The filler and receptor nozzles may be constructed of any suitable material known in the valve and connector arts, such as plastic or metal and the like. Similarly, the compressible material and the sealing rings may be of any known resilient material such as rubber. Springs 16 and 40 could also be replaced by any equivalent suitable biasing means known in the art.

It should be noted that this concept of poppet displacement by contact with a container opening of a polygonal configuration different than that of the poppet whereby flow will occur in the areas of noncontact with just slight displacement of the poppet of the receptor nozzle is an important feature of the present invention. Therefore, it is within the contemplation of the present invention that any noncircular configuration of the container aperture, such as a triangle, a pentagon, a hexagon and other regular polygons such as shown in FIGS. 7-10 can be used equally well. In the converse, it is within the scope and contemplation of the present invention to reverse the concept and to make the container aperture circular and to use a noncircular element as part of the exposed section of the injection nozzle. Many modifications of the particular nozzle configurations are obvious in light of the realization of the round ball in a noncircular hole concept.

For instance, FIGS. 4-6 illustrate a slight modification wherein communication tubes 50 for the fluid are provided within poppet 48. The mushroom check valve 46 has little bearing upon the principle itself and any suitable check valve such as a conical or spherical check valve may be used as long as it functions to prevent back flow. It is also contemplated that the filling nozzle check valve could be other than a ball check valve, for instance the valve could be in the form of a cone or a truncated cone.

It is also within the contemplation of the instant invention that the filler and receptor nozzle be effectively used to effect liquid transfer without using the sliding, spring biased sleeve 32. If the housing 18 without sleeve 32 were used as the filling nozzle then the compressible material 28 would still act as a seal and prevent the lateral escape of liquid during transfer. A drawing of this sleeveless configuration is not shown. However, the structure would be the same except there would be no need for outwardly extending flange 22 nor would annular channel 24 nor sealing O-ring 26 be needed. This sleeveless structure would be particularly adaptable to transfer systems where high pressure sealing is not necessary.

It is also within the contemplation of the instant invention to provide the two nozzles with locking devices to hold them in a permanent connected configuration. Any suitable attaching means such as a bayonet or threaded couplings will suffice.

It is further within the contemplation of the present invention that the concept of the present invention not be limited just to liquid transfer systems but that generically this concept can be used in any unidirectional fluid transfer system such as to transfer liquefied propellants for instance for use with filling aerosol containers.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described:
What is claimed is:

1. A filling means for use with a receiver having an aperture in a surface located therein, and a valve means located in said receiver aperture; said filling means comprising:
    a housing having an end wall;
    said end wall having an aperture therein;
    a biased check valve means located within said housing and adapted to seat in said end wall aperture;
    a primary, compressible sealing means affixed exteriorly on said end wall of said housing in surrounding relation to said housing end wall aperture;
    said compressible sealing means projecting outwardly away from said end wall and beyond said check valve means;
    whereby, in operation, said compressible sealing means will contact the surface of a receiver to provide a substantially leak-free seal between said filling means and said receiver prior to said check valve means contacting a corresponding valve means in said receiver aperture.

2. The filling means of claim 1 wherein said filling means housing has a cylindrically shaped portion;
    a slidably mounted sleeve disposed about and spaced from said housing; and
    biasing means disposed between said housing and said sleeve.

3. The filling means of claim 2 wherein said sleeve has two ends;
    a secondary sealing means located at said sleeve end which is substantially contiguous to said housing end wall, for providing a secondary sealing engagement between said filling means and a receiver.

4. The filling means of claim 3 further including sleeve biasing means for normally biasing said sleeve in the direction of said first sleeve end.

5. The filling means of claim 13 wherein said sleeve biasing means is a first spring and said check valve means is biased by a second spring.

6. The filling means of claim 1 wherein at least that portion of said check valve means which is adapted to contact a valve means in a receiver is rounded.

7. The filling means of claim 1 wherein said primary compressible sealing means has a disclike shape.

8. In combination the filling means of claim 1 and a receiver, said receiver comprising a housing adapted to receive gas or fluid from said filling means; said receiver housing comprising;
    an end wall with an aperture therein;
    a backflow check valve means disposed within said receiver aperture;
    said receiver valve means, in operation, being adapted to be contacted by said valve means in said filling means.

9. The combination of claim 8 wherein said aperture in said receiver surface is noncircular and said receiver valve means comprises a check valve and a round poppet depending from said valve and adapted to normally reside in said receiver aperture.

10. The combination of claim 8 wherein said receiver valve means comprises a check valve and a poppet depending therefrom and the external surface of said poppet and the shape of said aperture in said receiver surface are nonmating.

11. The combination of claim 8 wherein said receiver valve means comprises a check valve and a poppet depending therefrom wherein the shape of said aperture and the external surface of the poppet are mating and said receiver valve means has at least one aperture in said poppet extending to said receiver check valve.

12. A filling nozzle for filling a receiver, said nozzle comprising:
    a housing having two ends, a cylindrically shaped sidewall portion and an inner and outer wall;
    one end of said housing comprising an end wall having an aperture therein;
    primary sealing means affixed externally on said end wall having said aperture therein;
    said housing sidewall portion having an annular shaped flange located on the exterior wall of said sidewall portion and disposed contiguous to the remaining end of said housing;
    check valve means normally disposed within said housing to seat in said end wall aperture;
    biasing means located within said housing for biasing said check valve means to normally seat in said aperture,
    a slidable sleeve having an inner and outer wall and having a portion thereof disposed about and spaced from said housing sidewall;
    a retaining means located on said inner wall of said sleeve for limiting the movement of said sleeve relative to said housing and for contacting said housing flange;
    said sleeve having a front portion with an end wall therein;
    secondary sealing means located on said end wall of said sleeve front portion; and,
    sleeve biasing means disposed between said sleeve inner wall and said outer wall of said housing for normally urging said sleeve axially in the direction of said secondary sealing means,
    whereby, said filling nozzle, when used with a receiver, will have said sealing means contact said receiver to provide a substantially leak-free seal between said filling nozzle as said receiver prior to said check valve means contacting said receiver and opening a valve means in said receiver.

13. In combination the filling nozzle of claim 12 and a receiver, said receiver comprising a housing adapted to receive gas or fluid from said filling nozzle; said receiver housing comprising;
    an end wall with an aperture therein;
    a backflow check valve means disposed within said receiver aperture;
    said receiver valve means, in operation, being adapted to be contacted by said valve means in said filling nozzle.

* * * * *

UNITED STATES PATENT OFFICE
CERTIFICATE OF CORRECTION

PO-1050
(5/69)

Patent No. 3,642,037          Dated February 15, 1972

Inventor(s) Ernest R. Cunningham

It is certified that error appears in the above-identified patent and that said Letters Patent are hereby corrected as shown below:

Column 5, line 43, "13" should be --4--.

Signed and sealed this 13th day of June 1972.

(SEAL)
Attest:

EDWARD M. FLETCHER, JR.
Attesting Officer

ROBERT GOTTSCHALK
Commissioner of Patents